(12) United States Patent
Schultz et al.

(10) Patent No.: US 7,512,511 B1
(45) Date of Patent: Mar. 31, 2009

(54) IMPROVISED EXPLOSIVE DEVICE COUNTERMEASURES

(75) Inventors: Eugene M. Schultz, St. Louis, MO (US); Randy D. Curry, Columbia, MO (US); Richard A. Niksch, Florissant, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/393,386

(22) Filed: Mar. 30, 2006

(51) Int. Cl.
*G01R 23/02* (2006.01)
(52) U.S. Cl. .................. 702/127; 250/250; 324/637
(58) Field of Classification Search ............ None
See application file for complete search history.

(56) References Cited

U.S. PATENT DOCUMENTS

| | | | | |
|---|---|---|---|---|
| 5,668,342 A | * | 9/1997 | Discher | 86/50 |
| 5,900,833 A | * | 5/1999 | Sunlin et al. | 342/22 |
| 6,057,765 A | * | 5/2000 | Jones et al. | 340/572.2 |
| 6,163,259 A | * | 12/2000 | Barsumian et al. | 340/572.2 |
| 6,897,777 B2 | * | 5/2005 | Holmes et al. | 340/572.2 |
| 7,130,624 B1 | * | 10/2006 | Jackson et al. | 455/420 |
| 2005/0064922 A1 | * | 3/2005 | Owens et al. | 455/575.5 |
| 2006/0082488 A1 | * | 4/2006 | Keller, III | 342/22 |
| 2007/0013577 A1 | * | 1/2007 | Schnitzer et al. | 342/90 |

* cited by examiner

*Primary Examiner*—Manuel L Barbee
(74) *Attorney, Agent, or Firm*—MacPherson Kwok Chen & Heid LLP; Brent A. Folsom

(57) ABSTRACT

A method and system for mitigating the effectiveness of IEDs are disclosed. The method can include detecting IEDs by sensing the presence of a non-linear electronic component of an IED. The presence of a non-linear electronic component of the IED can be detected by illuminating the device with a high power microwave signal containing a plurality of radio frequencies of electromagnetic radiation and receiving sum and/or difference frequency components that are produced by interaction of the illuminating signals with a non-linear IED component and subsequently re-radiated.

22 Claims, 4 Drawing Sheets

IMPROVISED EXPLOSIVE DEVICE COUNTERMEASURES

TECHNICAL FIELD

The present invention relates generally to microwave electronics and, more particularly, to a method and system for detecting, locating, disabling and/or destroying Improvised Explosive Devices (IEDs), such as by using high power microwaves.

BACKGROUND

IEDs are used to injure or kill people and to damage vehicles and other equipment. IEDs can be fashioned as roadside bombs that are detonated when a vehicle passes nearby. IEDs can be elevated, such as by placing them upon road signs or trees, so as to more effectively focus their energy on less armored portions of a vehicle. They can also be buried or partially buried in order to make them more difficult to find.

IEDs are typically constructed from artillery or mortar shells. They can also be made from explosives from a wide range of other sources. In many cases a detonator is attached so as to facilitate initiation of the explosion. The detonator can be remotely controlled by cellular telephone, radio, garage door opener or another electronic device. By using such electronic devices, the IED can be remotely detonated via either a manned trigger command or the use of automated fusing, e.g., by sensing the proximity of a vehicle.

The use of such IEDs by insurgents in Iraq has become commonplace. Indeed, it has been estimated that IEDs have, to date, accounted for a significant fraction of the coalition deaths in Iraq. Consequently, it would be beneficial to be able to detect, locate, disable and destroy IEDs such as those used by insurgents as roadside bombs in Iraq.

SUMMARY

Systems and methods are disclosed herein to provide for mitigating the effectiveness of IEDs. One or more embodiments of the present invention comprise detection of an IED by sensing the presence of non-linear electronic component(s) used in the IED's construction.

Detecting the presence of a non-linear electronic component of the IED can be accomplished by simultaneously illuminating the device with multiple radio frequency (RF) electromagnetic signals and receiving a complex RF signal return which contains sum and/or difference frequencies and/or harmonics that are produced by interaction of the illumination signals with one or more of the IED's non-linear components.

Illuminating the IED with RF electromagnetic radiation can be accomplished by employing two narrow band RF signal sources. Alternatively, illuminating the IED with RF electromagnetic radiation can employ three, four, five, six or more narrow band RF sources. Additionally, one or more of the illuminating RF sources may employ wideband (WB) or ultra wideband (UWB) waveforms.

According to one embodiment of the present invention, the received complex signal re-radiated from the IED non-linear circuit(s), containing sum and/or difference frequencies, can be compared with stored signature data to confirm the detection of an IED. In this manner, false positives (false indications that an IED has been detected) are greatly reduced.

The location of the IED can be more precisely determined by illuminating it using a narrow beamwidth transmit-receive microwave system whose azimuth & elevation angles are well known versus time. Two or more options are possible. A first option comprises transmitting two or more relatively low frequency illuminating signals using fixed wide-beamwidth antennas. A higher frequency signal, i.e., the re-radiated sum frequency signal with or without harmonic content, can be captured using a narrower beamwidth antenna operating at a higher, e.g., sum, frequency.

A second option comprises using synchronized scanning transmit/receive antennas, wherein one set uses lower frequencies and another set uses higher frequencies. In the second option, the higher frequency transmit or receive antenna would be used as the primary source for determining IED position. For either option, IED position knowledge can be enhanced by employing a combination of information including the slant range to detected IED using the multi-frequency round trip propagation time from RF source to IED and the position of the illuminating platform obtained from aircraft Global Positioning Satellite (GPS) information and/or the location of the terrain and its features/buildings obtained from previously stored location and/or signature data bases.

The IED can be disabled and/or destroyed by illuminating the device with a burst of comparatively higher power RF electromagnetic radiation. This can be done using a narrower beam antenna coupled to the illuminating RF source.

Thus, detecting the presence of non-linear electronic components of IEDs can be implemented by simultaneously illuminating the IED with two or more transmitted RF signals and receiving resultant, identifiable sum/difference complex signals whose spectral signatures are know. Determining the location of the IED can make use of knowledge of the azimuth/elevation of the narrowest beamwidth transmit/receive antenna in conjunction with precise pointing angles of the narrow beamwidth antenna, the round trip propagation time aircraft-to-IED and the GPS coordinates of the illuminating aircraft/antenna. Disabling the IED can be accomplished by illuminating the device with a burst of comparatively higher power microwave radiation using a comparatively narrow beam RF source/antenna.

Even the comparatively lower power RF sources used for detection can employ high power RF sources. These RF sources can merely be lower in power than the RF sources used to disable or destroy the IED.

In one or more embodiments of the present invention, a system for mitigating the effectiveness of IEDs can comprise one RF transmitter using a plurality of radio frequencies radiated towards the implanted device such that the radio frequency return generated by a non-linear component of the IED can contain complex recognizable signals and can be re-radiated back towards the illuminating aircraft. The counter-IED system can also include a receiver for detecting the complex radio frequency IED re-radiated return. The azimuth/elevation angles of the higher frequency transmit/receive antenna can be used to locate the IED in conjunction with other available aircraft/surface data, e.g., aircraft GPS-determined location, terrain features/locations, etc.

Reception of the return, particularly if verified, is an indication that an IED has been detected. Once such an indication that an IED has been detected is obtained, then procedures can be implemented to render the IED ineffective.

According to one or more embodiments of the present invention, the system can employ a high power burst transmitter for rendering IEDs ineffective. The high power burst transmitter can either disable or destroy the IED. In either instance, the IED is rendered ineffective.

First and second transmit signals can use narrow band dual frequency, high power microwave illuminating transmitters. A second transmitter can use narrow band, wideband (WB) or Ultra-Wideband (UWB) signals. The highest frequency transmit/receive antenna can have the narrowest beamwidth and can be employed for IED location determination. The burst transmitter can use a high power microwave (HPM) RF source and a narrow beam transmit antenna.

The electromagnetic radiation used to detect, locate, disable and/or destroy an IED can employ microwave electromagnetic radiation. The frequency content of the illuminating signal(s) used for detection, location and disablement or destruction respectively can be the same as one another or vary depending on desired functionality. For example, one pair of frequencies can be used for detection, a different pair can be used for location and one of the two frequencies used for location can be used for disablement or destruction.

The scope of the invention is defined by the claims, which are incorporated into this section by reference. A more complete understanding of embodiments of the present invention is available to those skilled in the art, as well as a realization of additional advantages thereof, by a consideration of the following detailed description of one or more embodiments. Reference can be made to the appended sheets of drawings that can first be described briefly.

BRIEF DESCRIPTION OF THE DRAWINGS

Embodiments of the present invention and their advantages are best understood by referring to the detailed description that follows. It should be understood that like reference numerals are used to identify like elements illustrated in one or more of the figures.

DETAILED DESCRIPTION

Figure 1:
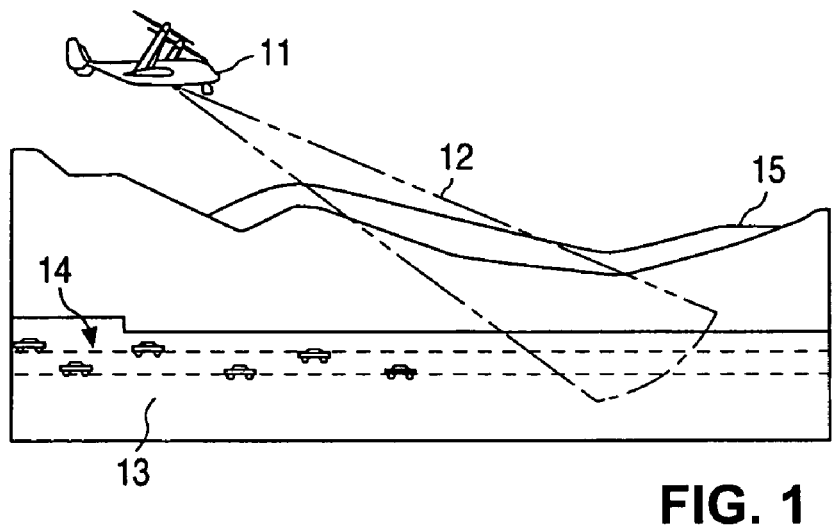
FIG. 1 shows a schematic diagram illustrating the use of an IED countermeasures system in accordance with an exemplary embodiment of the present invention, wherein a wide beam, dual band, high power microwave transmission is being broadcast to determine if an IED is present.

Contemporary electronic devices almost universally contain non-linear electronic components. Examples of non-linear electronic components include diodes and transistors. Thus, the cellular telephones, radios, garage door openers, or other electronic devices used in the detonators of IEDs typically contain non-linear electronic components.

Such non-linear electronic components tend to function as inefficient radio frequency mixers when illuminated with two or more frequencies of RF electromagnetic radiation. When the non-linear electronic components function as radio frequency mixers, they produce harmonics of the illumination frequencies, as well as sum and difference frequencies of the illumination frequencies. These harmonics, sum, and difference frequencies are re-radiated and can be detected, e.g., received and recognized. Generally, the sum and difference frequencies are of greater amplitude as compared to the harmonic frequencies, and thus are often easier to detect.

As used herein, the term "detecting" can refer to the process of determining that an IED is likely to be present in the general direction of illumination. The term "locating" can refer to more precisely determining where the IED has been placed. The term "disabling" can refer to rendering the IED ineffective, such as by inhibiting its ability to be remotely detonated, i.e., dudding. The term "destroying" refers to exploding or partially exploding the IED.

According to one embodiment of the present invention, an IED can be detected by illuminating an area using a multi-frequency, high power microwave (HPM) RF transmitter/antenna. When the IED is illuminated by the multi-frequency HPM transmitter, sum and difference frequencies and/or harmonics of the transmitted frequency are generated by interacting with non-linear circuits included in the IED. These transformed RF signals are re-radiated from the IED towards the illuminating HPM RF source and received through an antenna located on the transmitting platform.

The receive antenna operates at the sum/difference frequency(s) and feeds a receiver tuned to the transformed signal spectrum. After detecting, the presence of an IED, its presence can be verified by determining if the characteristics of the re-radiated signal corresponding to likely device signatures. After being verified, the location of the IED can be more precisely found by determining the azimuth and elevation angles of the highest frequency, e.g., narrowest beam, transmit/receive antenna, as well as the round-trip propagation time from the transmitter to the IED and back to a receiver. This gives the location of the IED relative to the HPM platform. The location of the HPM system platform can be determined via the platforms GPS coordinates and/or the surface features of the terrain.

Further, according to one embodiment of the present invention, an IED can be disabled or destroyed by illuminating it with a burst of high power microwave radiation. These processes are described, with reference to the figures, in further detail below.

Figure 2:
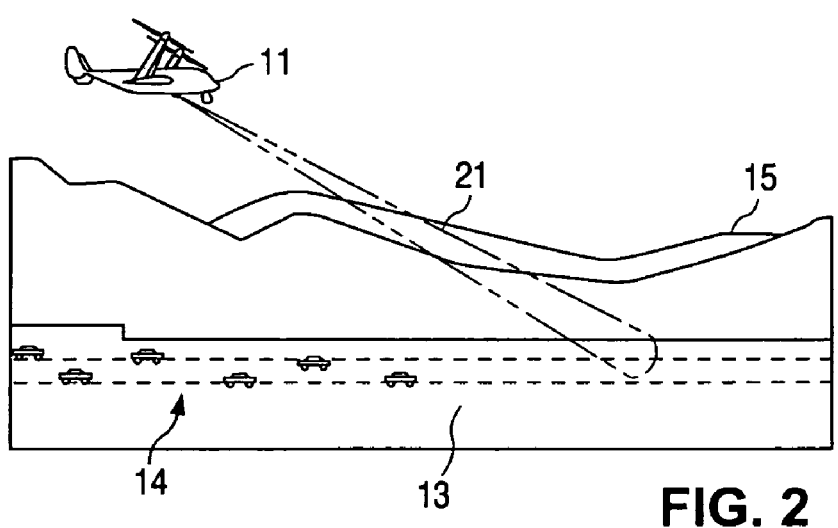
FIG. 2 shows a schematic diagram further illustrating the use of the IED countermeasures system of FIG. 1, wherein a higher frequency narrow beam (transmit/receive) antenna is being used to determine the location of an IED.
Figure 3:
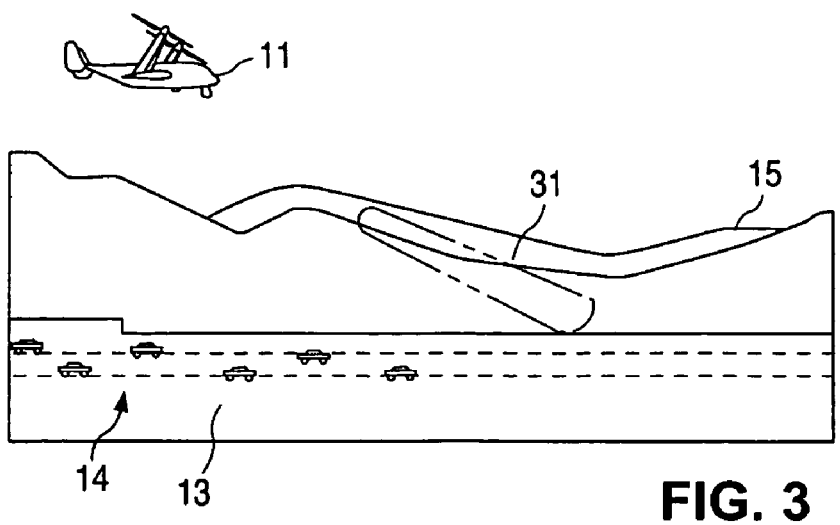
FIG. 3 shows a schematic diagram further illustrating the use of the IED countermeasures system of FIG. 1, wherein a narrow beam (such as a dual band narrow beam), high power, microwave burst is being transmitted to disable the IED.

FIGS. 1-3 show the use of an IED countermeasures system (with multiple HPM system beam shapes) that has been installed in a rotorcraft 11 (in the illustrated case, a tilt-wing aircraft is shown whose wings can rotate so as to provide operation like that of both an airplane and a helicopter). Alternatively, a fixed wing aircraft, a helicopter, or any other airborne vehicle can be used. However, a slower speed aircraft may be more effective for this application since flying at a slower speed illuminates the IED for a longer period of time, thus resulting in improved detection and destruction effects.

FIG. 1 shows rotorcraft 11 flying along a road 13 with mountains 15 in the background. A convoy 14 is traveling upon road 13. As discussed above, IEDs are commonly used as roadside bombs against such targets as a convoy 14.

The aircraft can serve as a platform for all components of the improvised explosive countermeasures system of the present invention. That platform can contain all of the transmitters, receivers and other equipments associated with the improvised explosive countermeasures system. It is possible that multiple aircraft can be used, with each aircraft having a portion of the improvised explosive countermeasures system. The aircraft can be piloted, remotely controlled, or completely autonomous, or any desired combination of piloted, remotely controlled, and completely autonomous aircraft can be used. A multiple aircraft counter-IED system can be more complex than a single aircraft counter-IED system, since both time of transmission/reception, angle of transmission/reception and multiple aircraft location can need to be synchronized when more than one platform is employed.

By installing such countermeasures systems on a rotorcraft or other airborne vehicle, both locating the IED and rendering it ineffective can be performed from the same platform and at a safe range. Alternatively, IEDs can be located and/or rendered ineffective using countermeasures systems installed in land based vehicles. Indeed, some countermeasures functions can be performed from airborne platforms and other countermeasures functions can be performed from land based platforms.

For example, the detection and location of IEDs can be performed from airborne platforms and rendering ineffective can be performed from land based platforms, or visa-versa. However, a more robust airborne detection/disablement HPM system is preferred in order to maximize the size of the territory searched and/or cleared of IEDs and so as to minimize damage from exploding ground embedded IEDs Rotocraft 11 can broadcast multi-frequency high power microwave radiation (such as via transmitter 150 and antenna 151 of FIG. 5) using a relatively wide antenna beam (such as beam 12 of FIG. 1). The wide antenna beam is used to illuminate the suspected area where it is believed that one or more IEDs have been placed. The use of a wide transmit antenna beam increases the coverage of the broadcast microwave radiation.

When wide beam 12 is incident upon an IED, multiple frequencies are mixed, albeit inefficiently, by one or more non-linear electronic component of the device's electronic circuitry. The resulting harmonics, sum, and difference frequencies are re-radiated and can be detected by the IED countermeasures system receiver of the present invention. That is, a microwave receiver (receiver 153 of FIG. 5) can be configured to receive these re-radiated frequencies.

Figure 5:
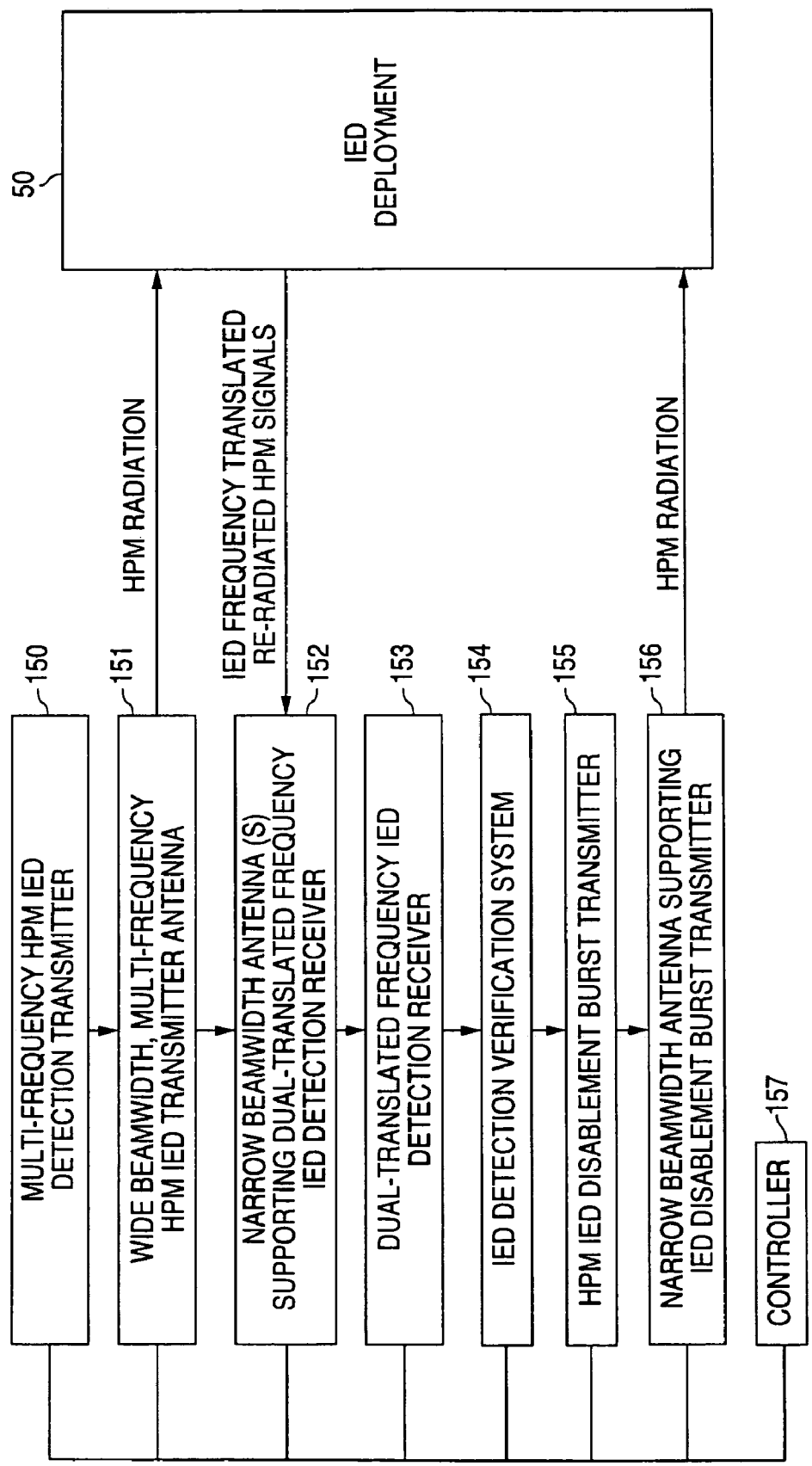
FIG. 5 shows a block diagram illustrating an IED countermeasures system in accordance with an exemplary embodiment of the present invention.

When such re-radiated frequencies are detected, the presence of an IED can be verified 154 (FIG. 5). Such verification can be performed by ascertaining whether or not the re-radiated RF spectrum is consistent with signatures of laboratory or field illuminated IEDs. For example, the re-radiated frequencies can be compared to known signatures of IEDs that have been illuminated in laboratory and/or field tests and the data then stored in a computer database (such as per block 154 of FIG. 5) for use on an airborne IED countermeasures platform.

In this manner, rotocraft 11 can illuminate a large area with a multi-frequency wide beam width (per block 151 of FIG. 5) high power microwave transmitter 150. For example, rotocraft 11 can fly along a highway that is about to be traversed by a convoy 14 and can provide IED detection, location and IED-disabling countermeasures for convoy 14.

FIG. 2 shows the rotocraft 11 of FIG. 1 functioning as the IED countermeasures system. It is being used to better determine the location of an IED, after the IEDs presence has been verified. To better determine the location of the IED, the higher frequency, narrow beam transmitter/receiver antenna that processes the high power microwave radiation can be used to more precisely determine the azimuth and elevation angles from the air platform to the ground emplaced IED. The round-trip propagation time (transmitter to IED and back to receiver platform) can be used to establish the slant range to the IED and GPS position information can precisely locate the position of the illuminating air platform As those skilled in the art can appreciate, the use of narrow beam 21 allows position of the IED to be determined more precisely. This is true because when a return from the IED is received, the device must be within the smaller angular region covered by narrow beam 21 (as opposed to the larger area covered by wide beam 12). Thus, narrow beam 21 can be used to better locate the IED.

The Global Positioning System (GPS) and/or other positioning and/or navigation systems can be used to project coordinates of the IED for subsequent countermeasure processing or for future reference. For example, these coordinates can be used by the same rotocraft 11, another rotocraft, or an altogether different type of vehicle (such as a land base vehicle, e.g., a truck) to render the IED ineffective.

FIG. 3 shows the rotocraft 11 of FIG. 1 as the IED countermeasures system thereof is being used to disable or destroy the IED. A narrow beam, high power microwave burst 31 can be directed toward the IED after its location has been established.

Either a single frequency or multiple frequencies can be transmitted in the burst. Information from the verification process can be used to determine the likelihood that the counter-IED system of the present invention can have the desired affect upon the IED. That is, the database of known IED re-radiated signatures contains information regarding the spectral content of the re-radiated signal from the IED and thus can be used to establish the likelihood that the countermeasure system can be used to render the IED ineffective. The database can contain information regarding the most effective frequency or frequencies for use in the burst.

Burst 31 of high power microwave radiation can cause malfunctioning of electronic devices, such as cellular telephones, radios, or garage door openers that are used to detonate the IED. Such malfunctioning can result in the inability to subsequently remotely control detonation (i.e. 'duding') of the IED, thereby rendering it ineffective. Such malfunctioning can also result in the premature detonation of the IED (that is, it can be detonated before convoy 14 is close enough to cause injury, death, or damage).

Figure 4:
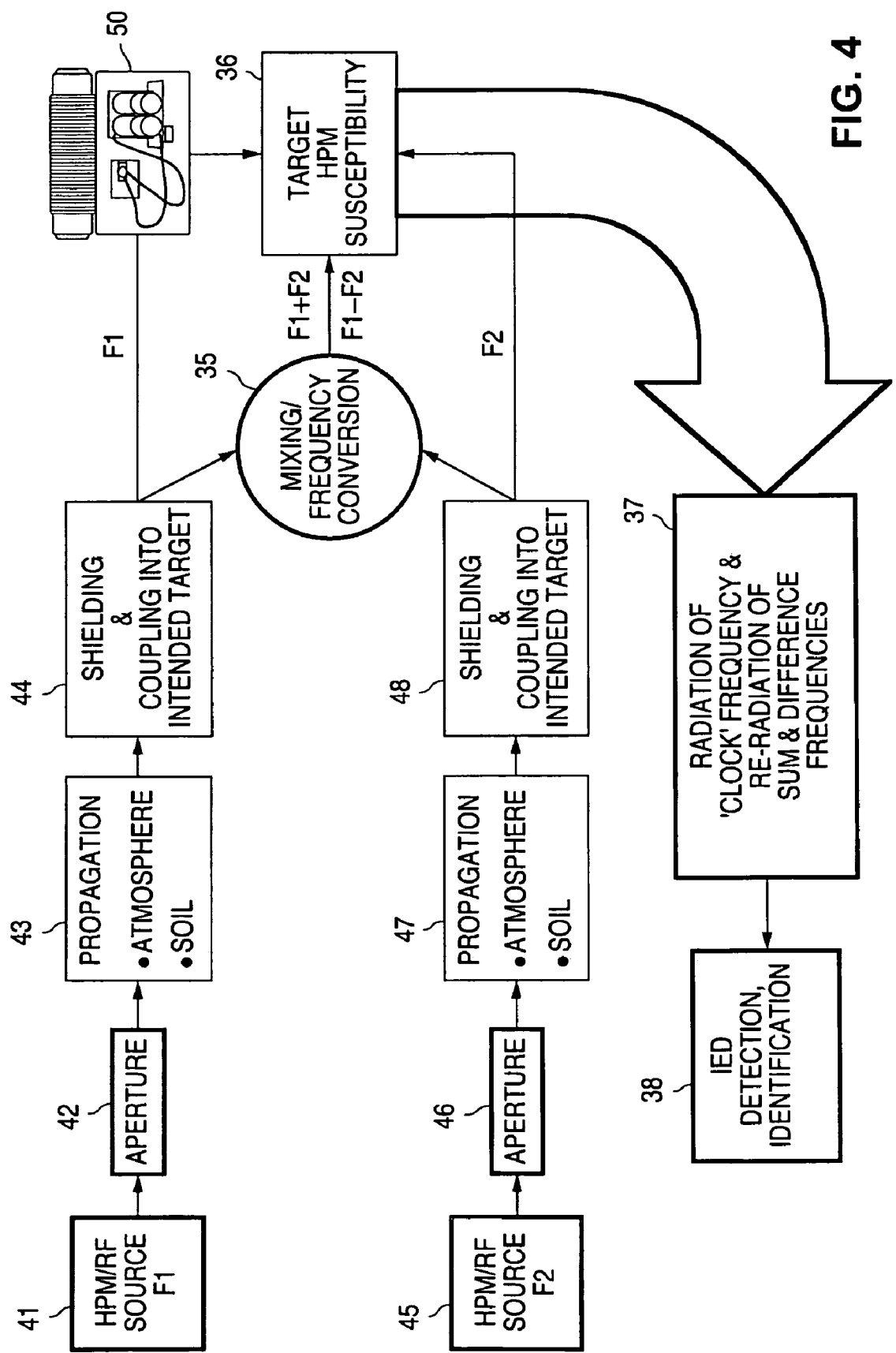
FIG. 4 shows a block diagram illustrating use of the IED countermeasures system in accordance with an exemplary embodiment of the present invention.

FIG. 4 is a block diagram illustrating operation of the IED countermeasures system of one or more embodiments of the present invention. As shown, two high power microwave sources, 41 and 45, each provide a different center frequency F1 and F2 RF sources. These two sources can be a single or dual band, narrow band, wideband (WB) or Ultra-Wideband (UWB) transmitters. Additionally, more than two sources can be used to provide more than two illuminating frequencies, if desired. The RF sources can be contained in a single multi-band transmitter or can be from separate transmitters.

HPM signal with center frequencies F1 and F1 are transmitted into the atmosphere via antennas or apertures 42 and 46, respectively. The HPM signal operating on frequency F1 undergoes propagation 43 through the atmosphere and possibly some soil as well. The HPM signal operating on frequency F2 likewise undergoes propagation 47 through the atmosphere and possibly some soil as well. Lower frequencies can be used for detection, location, and disablement or destruction when soil penetration is necessary (such as when the IED is buried or partially buried).

As indicated in blocks 44 and 48, frequencies F1 and F2 may encounter shielding that interferes with their desired coupling to the intended target, e.g., an IED. The use of high power microwave radiation enhances the likelihood of such coupling. Shielding can be part the IED or can be environmental, e.g., soil, water, rock, minerals, vegetation, or signage (such as metal road signs).

Remotely detonated IEDs can generally have an antenna by which it receives a radio frequency detonation command. Generally, this antenna can be exposed and thus susceptible to coupling with transmitted frequencies F1 and F2.

The result of coupling into the intended target 44 can produce mixing and frequency conversion 35 by non-linear components of the target. Such non-linear components can be diodes and transistors of a detonator that is remotely controlled by radio frequency. This mixing can result in a sum frequency of F1+F2 and a difference frequency of F1−F2 being generated and re-radiated towards the illuminating air platform. It can also result in various harmonic frequencies being produced and re-radiated. All of these resultant frequencies can, to some degree, be re-radiated. Typically, the sum frequency and/or the difference frequency can be the frequency or frequencies used for IED detection.

Generally, the sum and difference frequencies can have higher amplitudes than the harmonic frequencies. Also, it is often difficult to predict which harmonic frequencies can have the greatest amplitude; hence, the generation and use of laboratory/filed test signature data is invaluable for later use onboard the countermeasure air platform. Therefore, in many cases the sum and/or difference frequency signals can be used for IED detection, rather than any of the harmonic frequencies. However, the harmonic frequencies may be used instead of or in addition to the sum and/or difference frequencies. Indeed, in some instances the harmonic frequencies may provide enhanced detection, verification, and/or location with respect to the sum and/or difference frequencies.

The mixing and frequency conversion of block 35 results in target susceptibility 36 to high power microwave radiation. The target, i.e., the detonator of an IED, can be susceptible to detection and/or to being disabled or destroyed.

As indicated in block 37, radiation of the clock frequency of the detonator of an IED or of any other radio frequencies of the device can be detected remotely, such as from a flying aircraft or a land vehicle. Similarly, re-radiation of the harmonic, sum and/or differences frequencies can be detected. After detection and identification 38, electronic countermeasures can be employed to render the IED ineffective.

FIG. 5 is a block diagram illustrating an IED countermeasures system according to one embodiment of the present invention. According to this embodiment, a wide beam transmitter 150, a narrow beam receiver 153, and high power microwave burst transmitter 155 are used.

The wide beam transmitter 150 and antenna 151 define a high power microwave implementation in conjunction with the narrowband microwave antenna 152 and receiver 153 provides the required transmit/receive IED detection capability. Similarly, narrow beam transmitter 155 and antenna 156 can provide the required disablement/destruction functionality of the counter IED airborne system. Alternatively, a single transceiver or any desired combination of transceivers (such as a single transceiver taking the place of both the wide beam transmitter 150 and 151 and the narrow beam antenna 152 and receiver 153, but still using the separate high power microwave burst transmitter 155 and antenna 156) can be used. That is, any desired combination of transmitters and receivers can be used to provide for the transmission and/or reception of the wide beam, narrow beam and burst radio frequencies.

Further, the transmitters and receivers can either have a common antenna, each can have a dedicated antenna, or any desired combination of shared and dedicated antennas can be used. The antennas can be dish antennas, phased array antennas, or many other types of antennas. For example, wide beam transmitter 150 and antenna 151 and narrow beam antenna 152 and receiver 153 can use a shared phased array antenna to facilitate electronic beam steering and high power microwave burst antenna 156 can use a dish antenna for better power handling.

The frequencies of transmitters 150 and 155 can be selected such that they are effective in detecting, locating and disabling or destroying IEDs. These microwave frequencies of operation can be established by laboratory/field testing of likely IED systems. Microwave signal frequencies tend to have advantages in their directionality and in their ability to couple to the non-linear electronic components of IEDs as a result of high effective radiated power levels that are available in this frequency region.

High power microwave transmitters 150 and 156, and/or high power burst transmitter 185 can be variations of Airborne Active Electronically Scanned Arrays (AESA) such as the APG-79. Alternatively, these transmitters can be custom transmitters or any combination of contemporary transmitters, variations or modifications of existing transmitters, or custom transmitters.

A controller 157 can be used to point the wide beam transmit antenna 151, the narrow beam receive antenna 152 and/or high power microwave transmit antenna 156. Controller 157 can either use a general purpose computer or a custom controller. Alternatively, wide beam transmitter 150, narrow beam receiver 152 and/or high power microwave transmitter 156 can be manually controlled.

Controller 157 will set detection transmitter 150's waveform, power level, its duty cycle and the effective radiated power emitted from its wide beam antenna 151. Controller 157 will set disablement burst transmitter 155's power level, its waveform, its duty cycle/burst duration and the effective radiated power emitted from its narrow beam antenna 156. Controller 157 will also set select receiver 153's frequency range, bandwidth and scan parameters as well as narrow beam receiver antenna 152's pointing angles and scan parameters Thus, once detected, the presence of an IED can be verified. Once verified, its location can be more precisely defined. Then, the IED can be rendered ineffective by directing a burst of high power microwave radiation, such as via a narrow beam thereof, at the IED. Additionally, the IED can alternately be rendered ineffective by one or more means by using gunfire against it, such as with a gun mounted upon an airborne vehicle; by dropping ordinance upon it from an airborne vehicle; or by conventional explosive ordnance disposal methods (such as disarming and disposing of the IED or by detonating it in place with additional explosives).

Figure 6:
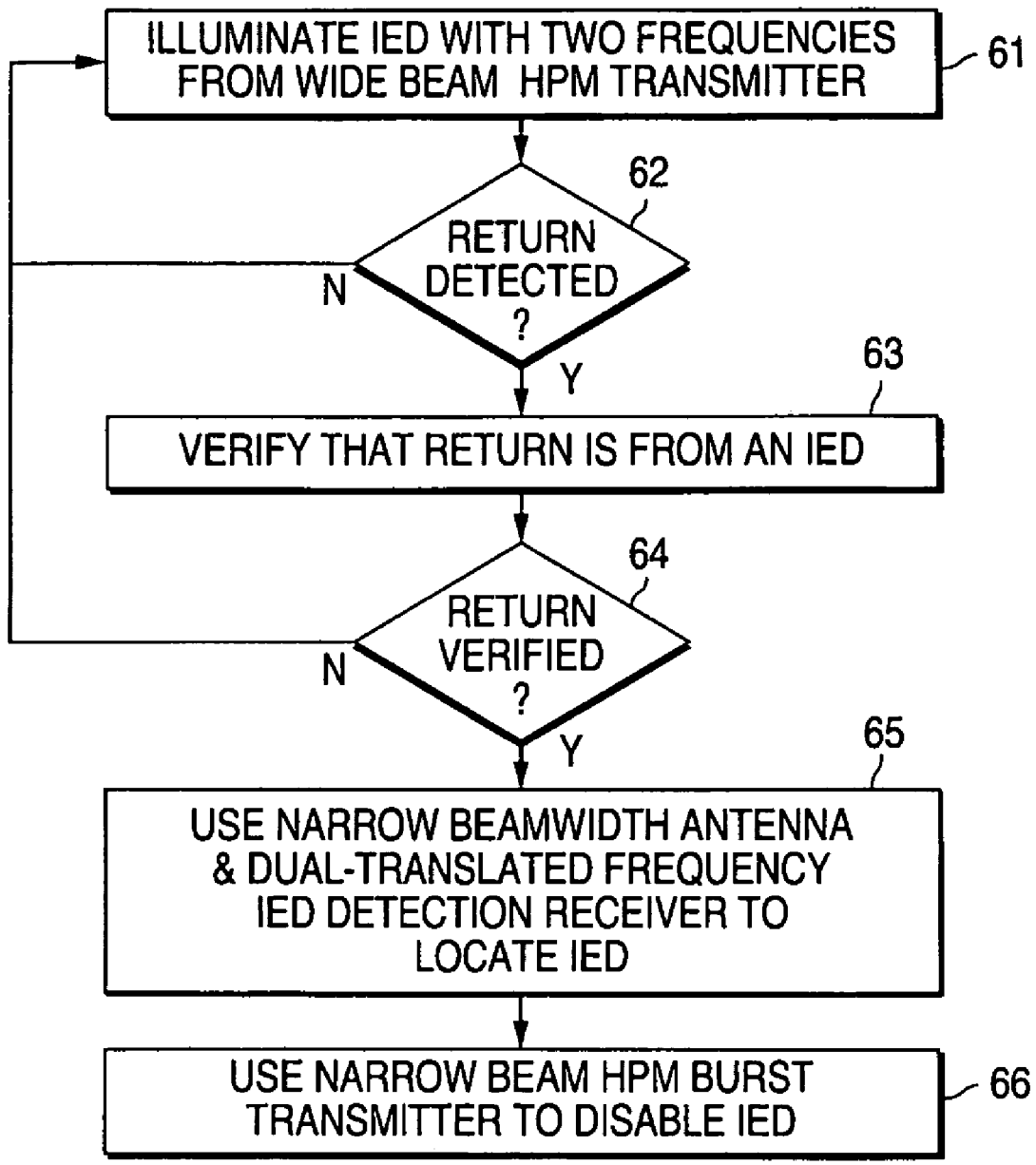
FIG. 6 shows a flow chart illustrating operation of the IED countermeasures system defined in FIG. 5.

FIG. 6 is a flow chart illustrating operation of an exemplary embodiment of an IED countermeasures system of the present invention, such as that shown in FIG. 5. A signal containing two or more frequencies of high power microwave radiation is directed toward a suspect area, such as along roadway 13 of FIGS. 1-3. This can be performed with wide beam, dual band, high power microwave transmitter 150 and transmit antenna 151. This process can continue until an IED is illuminated, as indicated in block 61.

When an IED is illuminated with the two frequencies of high power microwave radiation, the non-linear components thereof can re-radiate electromagnetic radiation, as described above. When such re-radiation occurs, the frequency-shifted return can be detected. If no return is detected (such as when no IED is being illuminated), the process of illumination can continue, as indicated by decision block 62.

When a return is detected, the return can be verified as indicated by block 63. Verification can be performed by comparing the return to a database of known IED re-radiation signatures. That is, a signal comparison process can be implemented to match the spectrum and relative amplitudes of the re-radiated RF return compared to those stored in the database. A match can indicate a high probability that the return is from an IED.

If the return is not verified, the illumination of the suspect area with wide beam high power microwave radiation can continue, as indicated by decision block 64. If the return is verified as likely being from an IED, then narrow beam dual band high power microwave radiation can be used to better determine the position of the IED, as indicated in block 64. This process can be performed with narrow beam antenna 152 and receiver 153.

Higher frequency microwave radiation can be used in the location process. As those skilled in the art understand, the use of higher frequency microwave radiation facilitates the use of a narrower beam. A narrowed beam provides more focused reception such that when a return is received, the possible locations where the IED can be disposed are more limited.

Once the location of the IED has been determined, then a burst of narrow beam, high power microwave radiation can be directed to the IED so as to disable or destroy it, as indicated in block 66. Alternatively, other methods for disabling or destroying the IED can be employed. For example, gunfire or explosive ordnance can be used to render the IED ineffective, as discussed above.

According to one or more embodiments of the present invention, IEDs, even partially buried IEDs, can be found and rendered ineffective. IEDs can be detected with few false positive indications. Detection, location and disablement or destruction can all be performed from a platform that is far enough away form the IED so as to be safe, i.e., substantially unaffected by an explosion of the device.

The risks associated with the use of surface vehicles, such as the vehicles in convoy 14 of FIGS. 1-3, are substantially mitigated. The risks associated with explosives ordnance disposal are also mitigated. Thus, one or more embodiments of the present invention provide a robust system for mitigating the risks associated with IEDs.

Embodiments described above illustrate but do not limit the invention. It should also be understood that numerous modifications and variations are possible in accordance with the principles of the present invention. Accordingly, the scope of the invention is defined only by the following claims.

We claim:

1. A method for mitigating effectiveness of an improvised explosive device (IED), the method comprising:
    detecting a presence of the IED by detecting a presence of a non-linear electronic component of the IED, wherein detecting the presence of the non-linear component of the IED comprises:
        illuminating the IED with a first signal containing a first plurality of frequencies and having a comparatively wide beam, and
        receiving a first complex signal return including at least one of sum or difference frequencies or harmonics produced by interaction of the first signal with one or more of the IED's non-linear components;
    in response to detecting the presence of the IED, verifying the presence of the IED by determining whether a signature of the first complex signal return is consistent with expected IED signatures;
    in response to verifying the presence of the IED, determining a location of the IED by:
        illuminating the IED with a second signal containing a second plurality of frequencies and having a comparatively narrow beam, and
        receiving a second complex signal return including at least one of sum or difference frequencies or harmonics produced by interaction of the second signal with one or more of the IED's non-linear components, wherein the second plurality of frequencies are higher than the first plurality of frequencies; and
    in response to determining the location of the IED, disabling the IED by directing a burst of electromagnetic radiation to the determined location of the IED.

2. The method of claim 1, wherein the frequencies of the first signal comprise at least two frequencies of microwave radiation.

3. The method of claim 1, wherein the verifying comprises comparing at least one of sum or difference frequencies or harmonics of the first complex signal with stored signature data in order to confirm detection of the IED.

4. The method of claim 1, wherein the frequencies of the second signal comprise at least two frequencies of microwave radiation, wherein the second signal is transmitted by a narrow beam antenna.

5. The method of claim 1, wherein the second complex signal is a microwave signal, wherein the receiving the second complex signal is performed using a narrow receive beam.

6. The method of claim 1, wherein the receiving the second complex signal comprises receiving microwave re-radiated energy, wherein the determining the location of the IED comprises using a highest available frequency component of the re-radiated energy.

7. The method of claim 1, wherein the disabling the IED comprises illuminating the IED with a burst of comparatively higher power microwave radiation using a comparatively narrow beam antenna.

8. A system for mitigating effectiveness of an improvised explosive device (IED), the system comprising:
    a first transmitter and a first transmit antenna for illuminating the IED with a first signal containing a first plurality of frequencies and having a comparatively wide beam;
    a first receiver and a first receive antenna for receiving a first complex signal return including at least one of sum or difference frequencies or harmonics produced by interaction of the first signal with one or more of the IED's non-linear components to detect a presence of the IED;
    a detection verification system for verifying a presence of the IED in response to the detected presence of the IED based on whether a signature of the first complex signal return is consistent with expected IED signatures;
    a second transmitter and a second transmit antenna for illuminating the IED with a second signal containing a second plurality of frequencies and having a comparatively narrow beam;
    a second receiver and a second receive antenna for receiving a second complex signal return including at least one of sum or difference frequencies or harmonics produced by interaction of the second signal with one or more of the IED's non-linear components to determine a location of the IED in response to the verified presence of the IED, wherein the second plurality of frequencies are higher than the first plurality of frequencies; and
    a third transmitter and a third transmit antenna for disabling the IED in response to the determined location of the IED by directing a burst of electromagnetic radiation to the determined location of the IED.

9. The system of claim 8, wherein the first transmitter is a microwave transmitter.

10. The system of claim 8, wherein the first transmitter is a dual band microwave transmitter.

11. The system of claim 8, wherein the first transmitter is a high power microwave transmitter.

12. The system of claim 8, wherein the first transmitter is a wide beam microwave transmitter.

13. The system of claim 8, wherein the first receiver is tuned to a specific frequency component of a re-radiated signal from the IED.

14. The system of claim 8, wherein the third transmitter is a high power burst transmitter for rendering IEDs ineffective.

15. The system of claim 8, wherein the third transmitter is a high power microwave burst transmitter for rendering IEDs ineffective.

16. The system of claim 8, wherein the second antenna has a relatively narrow beam.

17. The system of claim 8, wherein the first antenna has a relatively wide beam.

18. The system of claim 8, wherein the first, second, and third transmit antennas and the first and second receive antennas are dedicated antennas.

19. The system of claim 8, wherein two or more of the first, second, and third transmit antennas and the first and second receive antennas are shared antennas.

20. The system of claim 8, wherein the first, second, and third transmitters and the first and second receivers are dedicated transmitters and receivers.

21. The system of claim 8, wherein two or more of the first, second, and third transmitters and the first and second receivers are shared transceivers.

22. A system for locating an improvised explosive device (IED), the system comprising:

means for detecting a presence of the IED by detecting a presence of a non-linear electronic component of the IED, the detecting means comprising:
   means for illuminating the IED with a first signal containing a first plurality of frequencies and having a comparatively wide beam, and
   means for receiving a first complex signal return including at least one of sum or difference frequencies or harmonics produced by interaction of the first signal with one or more of the IED's non-linear components;

means for verifying the presence of the IED by determining whether a signature of the first complex signal return is consistent with expected IED signatures in response to the detecting means;

means for determining a location of the IED in response to the verifying means, the determining means comprising:
   means for illuminating the IED with a second signal containing a second plurality of frequencies and having a comparatively narrow beam, and
   means for receiving a second complex signal return including at least one of sum or difference frequencies or harmonics produced by interaction of the second signal with one or more of the IED's non-linear components, wherein the second plurality of frequencies are higher than the first plurality of frequencies; and means for disabling the IED by directing a burst of electromagnetic radiation to the determined location of the IED in response to the determining means.

\* \* \* \* \*